United States Patent [19]

Stubblefield

[11] 4,028,839
[45] June 14, 1977

[54] DEPTH CONTROL DEVICE FOR USE WHILE FISHING

[76] Inventor: Robert A. Stubblefield, 539 W. 300 North, Salt Lake City, Utah 84116

[22] Filed: Oct. 21, 1975

[21] Appl. No.: 624,438

[52] U.S. Cl. .............................. 43/43.13; 43/42.03; 43/42.39

[51] Int. Cl.² .................................. A01K 95/00

[58] Field of Search ........... 43/43.13, 42.03, 42.22, 43/42.23, 42.39, 3

[56] References Cited

UNITED STATES PATENTS

| | | | |
|---|---|---|---|
| 2,679,227 | 5/1954 | Symonds | 43/42.22 |
| 2,748,519 | 6/1956 | Dennison et al. | 43/3 |
| 2,789,386 | 4/1957 | Creelman | 43/43.13 |
| 2,924,907 | 2/1960 | Hamilton | 43/42.22 |
| 2,928,367 | 3/1960 | McCormick | 43/43.13 |
| 3,047,972 | 8/1962 | Taylor | 43/3 |
| 3,613,290 | 10/1971 | Louthan | 43/42.39 |
| 3,722,129 | 3/1973 | Jensen | 43/42.03 |
| 3,727,341 | 4/1973 | Nye | 43/43.13 |

*Primary Examiner*—Warner H. Camp
*Attorney, Agent, or Firm*—Hill, Gross, Simpson, Van Santen, Steadman, Chiara & Simpson

[57] ABSTRACT

A depth control device connects to a fishing line in front of a fish capturing means which senses the ambient water temperature and actuates a control surface to a diving attitude if there is any differential between the ambient water temperature and the temperature of the water at which the fisherman wishes the fish capturing means to operate.

11 Claims, 17 Drawing Figures

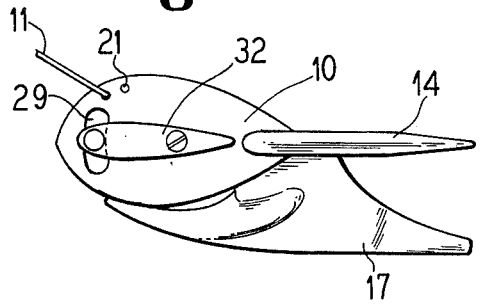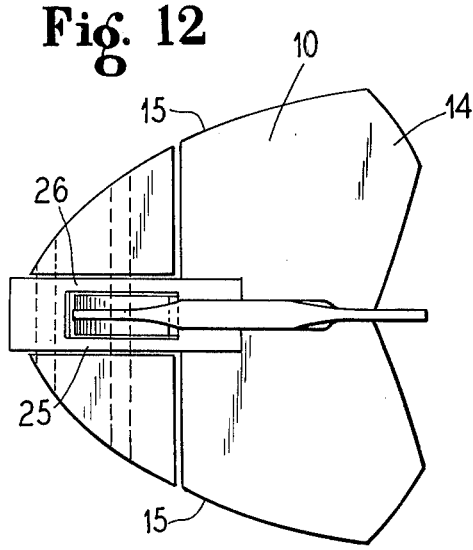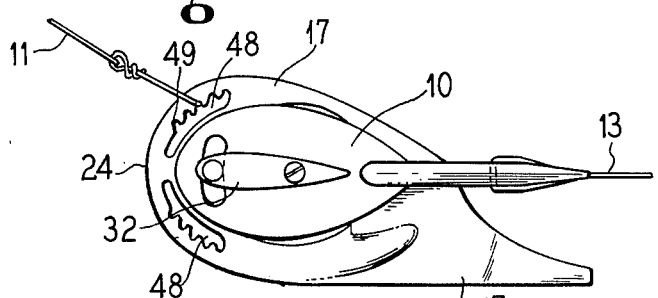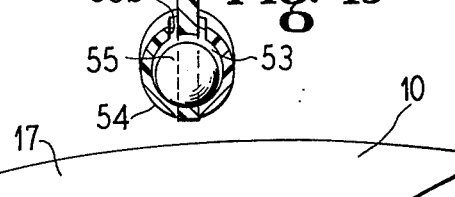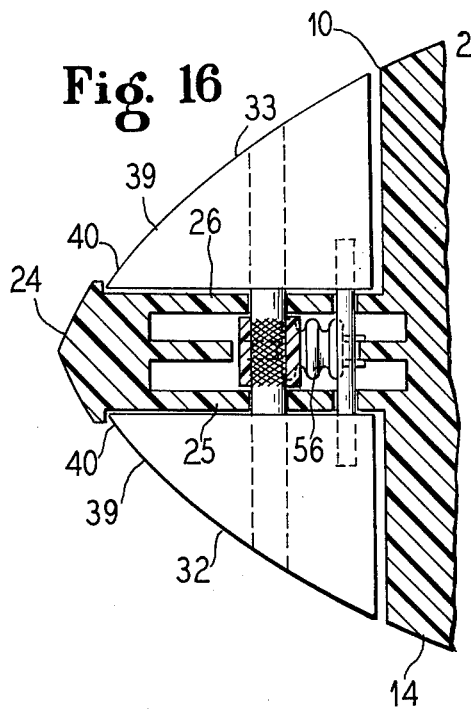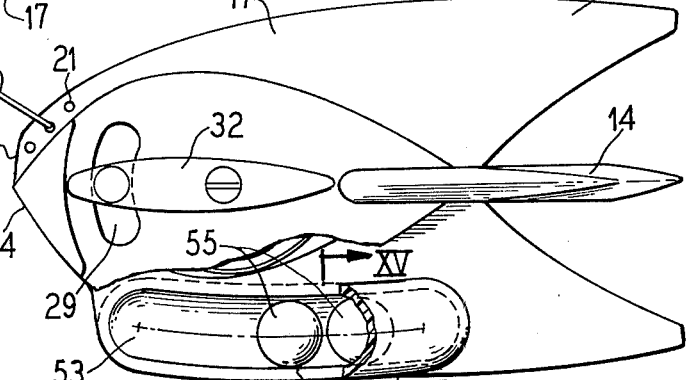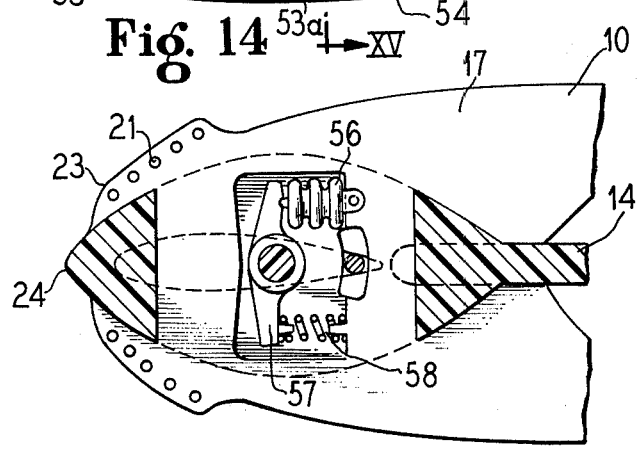

DEPTH CONTROL DEVICE FOR USE WHILE FISHING

BACKGROUND OF THE INVENTION

1. Field of Invention

This invention relates generally to fishing devices using a depth control means to control the depth of a fish capturing means such as a lure, net or other bait whereby the capturing means operates within a selected water temperature zone.

2. Description of Prior Art

In depth control devices, heretofore, a fisherman has been provided with a means for measuring the water temperature at particular depths. With this knowledge, the fisherman then could manually adjust the length of his line such that his fish capturing means was at the depth he desired. This method is exemplified by U.S. Pat. No. 3,628,274. As shown in disclosures such as U.S. Pat. Nos. 3,796,000 and Re. 28,262, also available are devices which sense water temperature and alternately descended and ascended as the device traverses in a zig zag path between the selected high and low limits of a temperature range as the device is being drawn through water.

SUMMARY OF THE INVENTION

In accordance with this invention, a fisherman notes the temperature zone in which the species of fish, which he is seeking, is most likely to be when feeding. He then selects a device, as disclosed by this invention, which is pre-set to operate within that temperature zone. Studies have shown that different species of fish prefer to feed within water having a particular temperature, for example:

|  | °F | °C |
| --- | --- | --- |
| Chinook salmon | 50 – 54 | 10.00 – 12.22 |
| Coho salmon | 53 – 55 | 11.67 – 12.78 |
| Lake trout (Mackinaw) | 45 – 55 | 7.23 – 12.78 |
| Steelhead (Great Lakes) | 58 – 60 | 14.44 – 15.56 |
| Northern Pike | 50 – 70 | 10.00 – 21.12 |
| Brown trout | 55 – 70 | 12.78 – 21.12 |
| Muskellunge | 60 – 70 | 15.56 – 21.12 |

The depth control device is best suited for use when fishing by trolling and is attached in front of a fish capturing means such as a lure.

Under normal summertime fishing conditions, the temperature of water in a lake or other similar body of water is at its maximum at the surface decreasing as depth increases. The opposite condition can exist in the late fall when the surface water, cooled by the fall air, is colder than the water below.

Individual depth control devices can be provided to operate in either of the respective water temperature conditions. As an alternative, the device can be designed to operate in either water temperature conditions by making the device symmetrical. When used in its right-side-up condition the device will dive from warmer to colder water. In an upside-down condition the device will dive from colder to warmer water below.

The device has a depth control surface which is actuated if there is a temperature differential between the ambient water temperature and the temperature at which the device is pre-set to operate. The angle of pitch to which the control surface is actuated is in direct proportion to the temperature differential.

If the differential is positive the control surface moves to a diving attitude. Likewise, if the differential is negative, the control surface moves to surfacing attitude.

Because the water at the surface is normally warmer than the design temperature, the control surface is actuated to a maximum diving attitude when the device is first placed in the water. As the fisherman begins to troll, the control surface causes the device and trailing lure to dive rapidly. As the device and lure descend into colder water and the temperature differential thereby decreases, the diving attitude of the control surface decreases. Once within the desired temperature zone, the attitude of the control surface proximates zero. If the temperature of the water at that depth becomes too cold, the control surface is actuated to a surface attitude, and the device and trailing lure ascend to warmer water returning to the selected temperature zone.

One unique characteristic of this device is that it continuously monitors its surrounding environment, and the depth control surface is only actuated if there is a difference between the ambient water temperature and the selected temperature. If the temperature of the water at the depth of operation increases or decreases, the control surface is actuated to make the necessary correction in depth to return the device to the selected temperature zone. In this fashion, there is only the slightest variation in the pulling force on a lure. Any fish attracting movement designed into the lure, therefore, is not affected by the depth control device.

The device is provided with both vertical and horizontal stabilizing fins to maximize smooth movement and to minimize any zig zag motion as the device and trailing lure are being drawn through the water.

BRIEF DESCRIPTION OF THE DRAWINGS

FIG. 11 is a side view of an alternate non-reversible configuration.

FIG. 12 is a top view of the device shown in FIG. 11.

FIG. 13 is a view depicting another alternate line attaching configuration.

FIG. 14 is a side view depicting the device with an alternative pitch, yaw and roll stabilizing means for use when connected to the fishing line as shown in FIG. 10.

FIG. 15 is a cross-sectional view through the stabilizing means to the rear.

FIG. 16 is a device depicting an alternate configuration of a depth control surface temperature sensing and actuator system.

FIG. 17 is a cross-sectional view through the top of the device shown in FIG. 16.

DETAILED DESCRIPTION OF INVENTION

Figure 1:
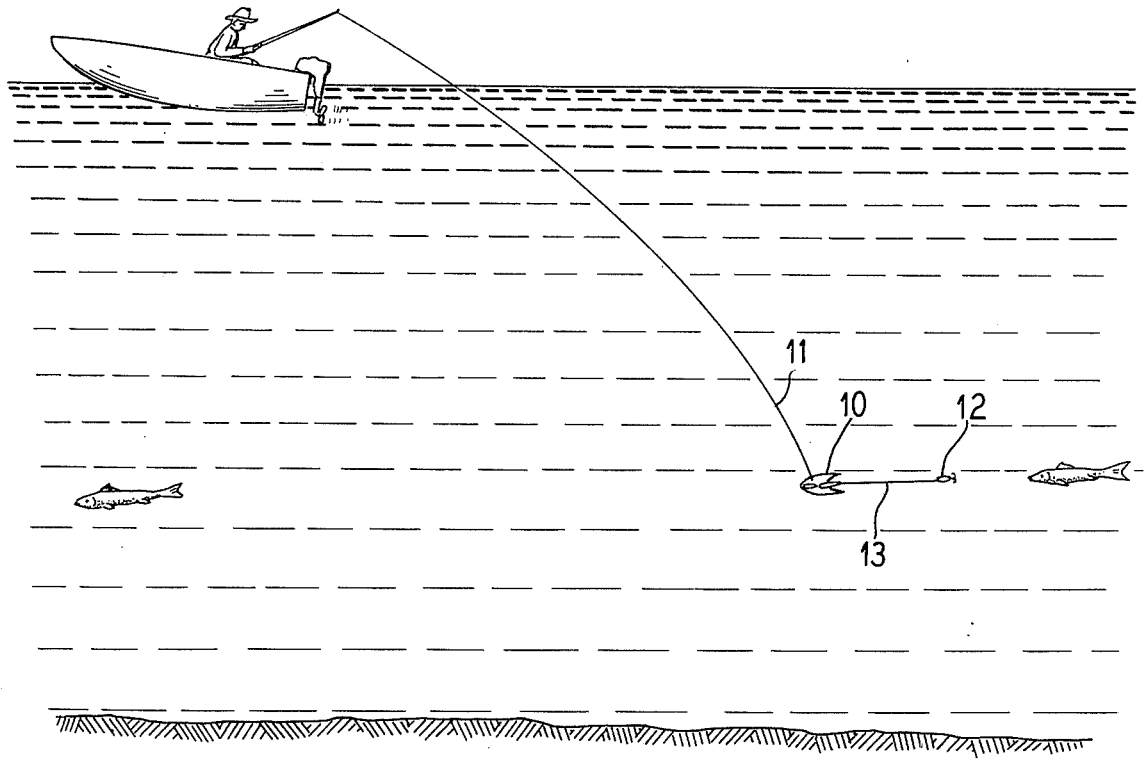
FIG. 1 is a view of a depth control device in use.
Figure 2:
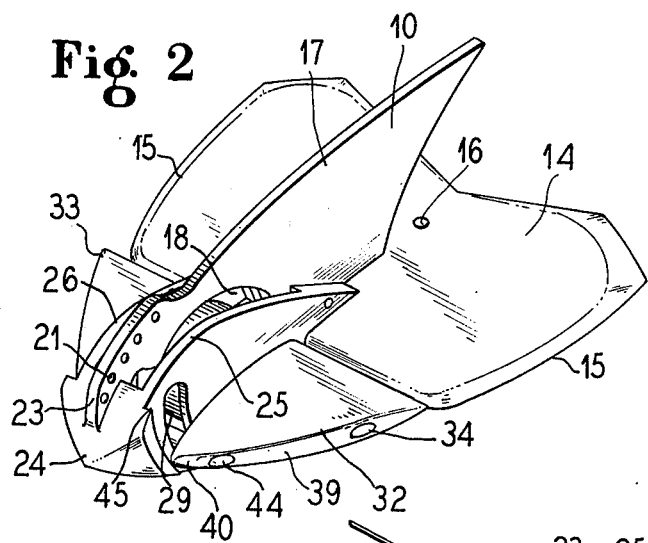
FIG. 2 is a perspective view of the device in its reversible configuration.
Figure 3:
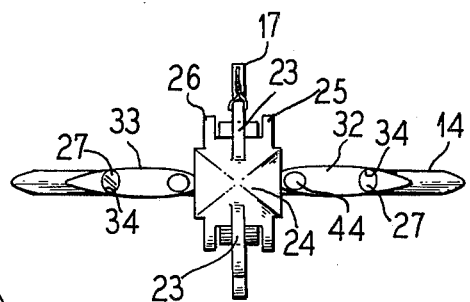
FIG. 3 is a front view of the device shown by FIG. 2.
Figure 4:
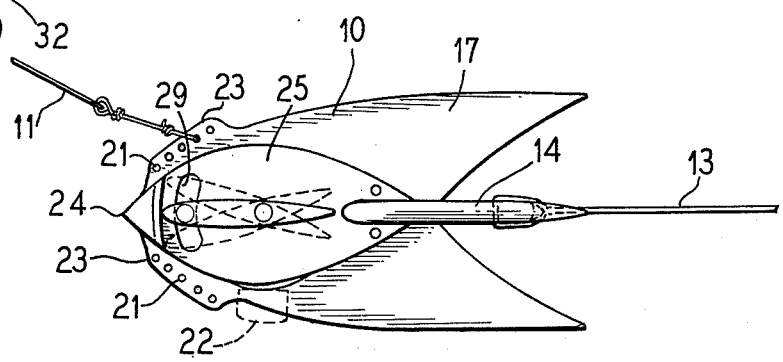
FIG. 4 is a side view of the device shown by FIG. 2 depicting the movement of the control surface.
Figure 5:
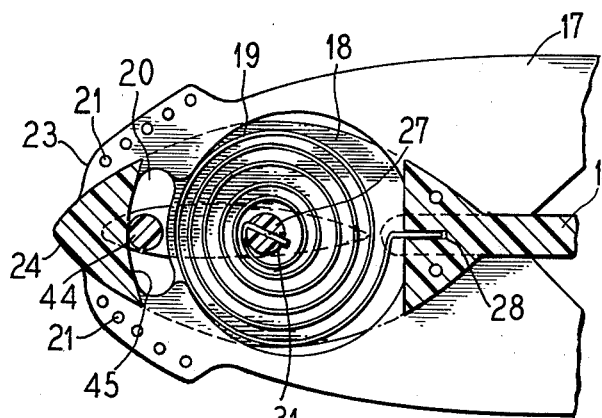
FIG. 5 is a cross-sectional view through the side of the device.

Referring to the drawings, a depth control device is shown generally at 10 and can be made from any suitable non-corrosive material such as plastic. As shown in FIG. 1, fishing line 11 is attached to the front of depth control device 10 and a fish capturing means 12 is in turn connected behind the device by a leader 13.

The device has a horizontal stabilizing fin 14 which is symmetrically disposed about the longitudinal axis of the device. The outer edges 15 gradually tapered to the front. A hole 16 is provided for attaching the leader 13 when the device is to be used as shown by FIG. 1.

A vertical stabilizing fin is shown at 17 and is symmetrically disposed about the longitudinal axis of the device when the device is made to operate in a right side up or upside-down condition depending on the temperature gradient of the water. In the forward portion of the vertical fin 17 is an elliptical hole 18 in which a bi-metal spiral coil 19 is located. Adjacent to and to the front of the hole 18 is a restraining slot 20. Hole 18 confines the outward expansion of coil 19.

In the outer forward edges of the vertical fin 17 are fishing line attaching holes 21 allowing the fisherman to select the location minimizing any roll, pitch or yaw deviations along its path of movement and thereby maximizing stability of the device. Factors which affect such deviations are the depth to which the device must actually dive to find the select temperature zone, the weight and drag of the fish capturing means being used, and the speed of the pulling boat. An additional weight 22 can be added if required. Forward outer edges 23 taper to form part of a prow 24.

Right and left elliptically shaped shaft supports 25 and 26 engage a shaft 27 on each side of the bi-metal coil 19. The outer end of the coil is positioned and fixed into slots 28 provided in the vertical fin 17 and shaft supports 25 and 26. Near the front portion of each support is a restraining slot 29 and 30 [not shown] which align with the slot 20.

The inner end of the coil 19 is in turn positioned into a slot 31 in the shaft 27. The ends of the shaft are affixed to a pair of depth control fins 32 and 33 respectively through a transverse hole 34 in each control fin. The hole 34 is so positioned that the effective surface area 35 in front of the hole 34 approximates the effective surface area 36 to the rear. Thereby, any rotational force created by the movement of water against forward portion 37 is offset by a counter-rotational force on rear portion 38. By providing this balancing, the magnitude of the torque generated by bi-metal coil 19 can be relatively small. Outer edges 39 of the control fins 32 and 33 taper to the front to form leading point 40.

Figure 6:
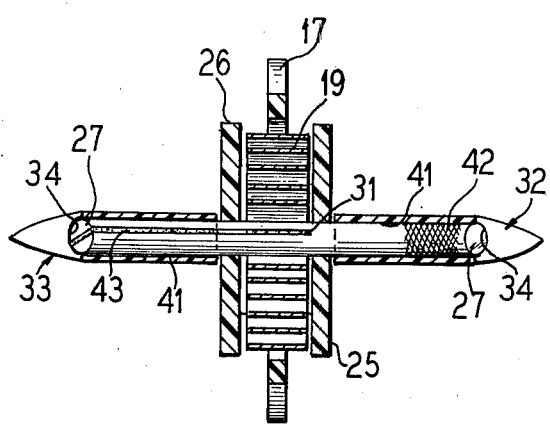
FIG. 6 is a cross-sectional view through the front of the device to the rear.
Figure 7:
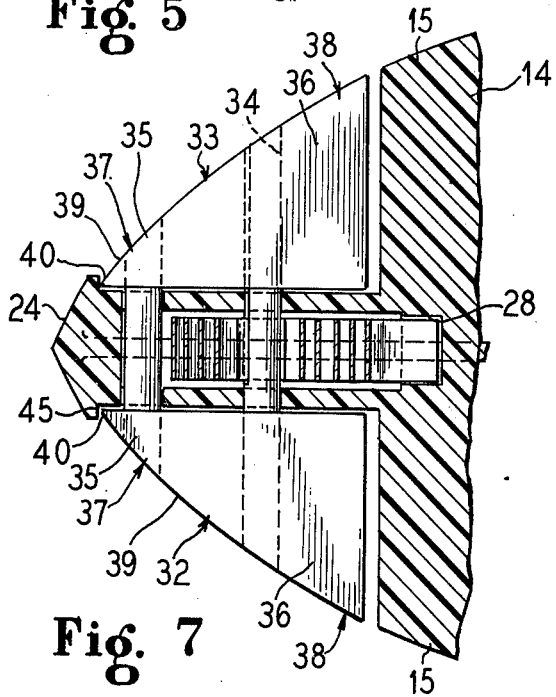
FIG. 7 is a cross-sectional view through the top front of the device to the bottom.
Figure 8:
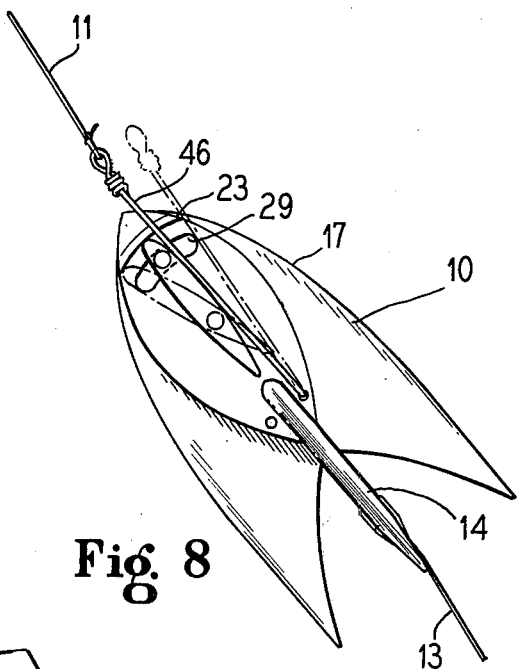
FIG. 8 is a view depicting the use of a line attaching bridle which aligns the control surface while the device is being reeled to the surface.
Figure 9:
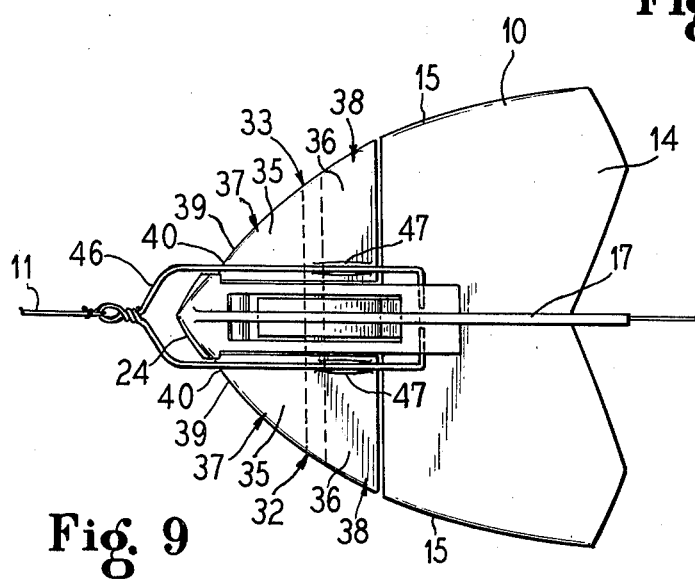
FIG. 9 is a top view of the device with the bridle.

The shaft 27 can be affixed to the plastic control fins 32 and 33 with a suitable mastic to form a joint 41. The joint 41 can be improved by knurling the outer surface of the shaft as at 42 or by slotting the shaft at the ends as at 43 to create a pressure fit between the shaft and the hole through the fins as shown in FIG. 6 at 41.

The relative position of the inner free end of the coil 19, the shaft 27, and the control fins 32 and 33 are so affixed that the control fins 32 and 33 align with the longitudinal axis when the ambient water temperature equals the selected temperature. If there is a positive temperature differential, i.e. if ambient water temperature exceeds the selected temperature, the coil 19 expands thereby rotating the control fins 32 and 33 counterclockwise to a diving attitude. In a reverse manner, the opposite occurs if there is a negative temperature differential. In this manner, the device 10 will correctly respond when it is placed in an upside-down position for use when the surface water is cooler than the selected temperature.

The total movement of the control fins 32 and 33 is limited by the slots 29, 30 and 20 in the respective shaft supports 25 and 26 and the vertical fin 17 which restrains a cross member 44 joining the front portion 37 of the control fins 32 and 33 respectively.

The vertical fin 17 and the shaft supports 25 and 26 merge to form the pyramid shaped prow 24. At the base of the prow 24, on each side, a vertical arched offset 45 is provided and acts to protect the leading point 40 of each control fin.

A bridle, which can be provided as an alternative fishing line attaching means, is shown at 46 and attaches to the vertical fin 17 behind the control fins 32 and 33. A groove 47 is provided in each control fin 32 and 33 to position the bridle 46 firmly against the control fins 32 and 33 and thereby aligning the two when the device is being brought to the surface. By so aligning, the control fins 32 and 33 do not impede this reeling-in or retrieval operation.

Another means for attaching the fishing line 11 is provided by a slot 48 in the vertical fin 17. The slot 48 is arched to conform with the exterior configuration of the fin and contains a series of forward angled grooves 49. During normal use, the grooves 49 are sufficiently angled to retain the attached line. When a fish strikes and restrains the lure 12, the resisting fish causes the fishing line 11 between the boat and the fish to straighten thereby allowing the attached line to slip to the forward end of the slot 48. With the line in this position, any drag from the control fins is minimized and the fish can be reeled-in or retrieved more easily.

Figure 10:
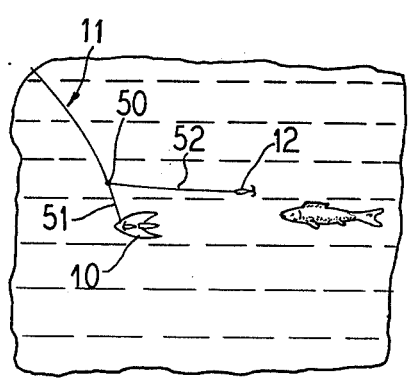
FIG. 10 is a view of an alternate form of the device in use.

The depth control device 10 also can be used as shown in FIG. 10. In this arrangement a 3-loop swivel joint 50 is connected to the fishing line 11. The depth control device 10 then is attached to one of the remaining loops by a leader 51 which is approximately 6 inches (15 centimeters) long. Another leader 52 approximately 3 feet (1 meter) long connects the lure 12 to the remaining loop.

When the depth control device 10 is used as shown in FIG. 10, stability of movement becomes more critical since there is no trailing lure. To increase stability, a circular passage 53 is positioned along bottom edge 54 of the vertical fin 17. The passage 53 is arched such that spherical weights 55 disposed in the passage 53 will roll to a low point 53a. The passage 53 is provided with an opening 53b so that it will fill with water. When the device 10 is in a diving attitude, weights 55 will roll to a forward position in the passage 53. With the weights 55 so positioned, the center of gravity of the device shifts forward and the diving attitude is more easily maintained. In a reverse fashion, when the device is in a surfacing attitude, weights 55 roll to the rear shifting the center of gravity to the rear. The shifting of the center of gravity assists the control surface to maintain the device 10 in a surfacing attitude. Because weights 55 lower the center of gravity, roll and yaw stability are also improved.

When the depth control device 10 is to be used in salt water, an alternate temperature sensor and control surface actuator system is desirable to withstand the highly corrosive effects of salt water. As a more corrosion resistant system, a gas filled bellows 56 is shown in contact with one end of a lever arm 57; a spring 58 attached to the other end of the lever arm 57 provides an added counter-directional force to assist the bellows 57 since the expanding force of the bellows 56 exceeds its contracting force.

While various modifications may be suggested by those versed in the art, it should be appreciated that I wish to embody within the scope of the patent warranted hereon all such modifications as reasonably and properly come within the scope of my contribution to the art.

I claim as my invention:

1. A trolling depth control device for use in troll fishing comprising,
   a body portion,
   first vertical fin means extending out of said body portion and forming fixed vertical water action surfaces to stabilize the device,
   said vertical fin means having formed thereon attaching means for connecting said device to trolling lines,
   second horizontal fin means extending out of said body portion and forming fixed horizontal hydrofoil surfaces,
   a depth control fin,
   means rotatably mounting said depth control fin on said body portion so that said depth control fin forms a movable control surface adjacent to said horizontal hydrofoil surfaces which is movable through a common plane relative to said horizontal fin means,
   said depth control fin being rotatably movable to selectively inclined positions relative to said hydrofoil surface to change the angle to attack of the device during trolling, and
   thermal control means connected between said depth control fin and said body portion to adjustably move said depth control fin automatically as a function of the thermal variations of the water,
   whereby said device may be used to tow a fishing line to selected depths of water.

2. A depth control device according to claim 1 and further characterized by said thermal control means comprising:
   a pivotally disposed lever arm,
   a gas-filled bellows, one end connected to said body and the other end engaging one of said arm,
   a coil spring, one end connected to said body and the other end engaging the other end of said arm, said lever arm being operatively connected to said depth control fin.

3. A depth control device according to claim 1 and further characterized wherein said attaching means being located above and below the longitudinal axis of said body, said device invertible for responding to inverted operating conditions.

4. A depth control device according to claim 1 and further characterized by said attaching means comprising:
   a bridle having a rear and forward portion, the rear portion of said bridle being pivotally attached to the body at a point behind the control fin, the forward portion of said bridle prepared for attachment to a trolling line, said forward portion being at a point in front of said body,
   said bridle having a right and left connecting member between said forward attaching portion and rear attaching portion, said connecting members contacting and aligning said control fin parallel to the longitudinal axis of the body when the device is being drawn to the surface of the body of water, and
   a second attaching means for connecting a leader of the fish capturing means and located near the rear of said body.

5. A depth control device according to claim 1 and further characterized by said attaching means comprising:
   a slotted opening in said vertical stabilizing means, the longitudinal centerline of said slot forming an acute angle to the rear with the longitudinal axis of said body,
   said opening having an outer longitudinal surface having at least two rounded grooves extending upwardly for attaching a trolling line, and
   a second attaching means for connecting a leader of the fish capturing means and located near the rear of said body,
   wherein an attached trolling line disengages from said groove and slips to the forward portion of said slot when the device is being drawn to the surface of the body of water or when a fish restrains the attached fish capturing means.

6. A depth control device for use with a fish capturing means being drawn through a body of water and adapted to seek a water level having a selected temperature comprising,
   a. a flat elongated vertical fin carried by said device, said fin having a tapered front portion and an opening through said fin adjacent to and to the rear of said front portion,
   b. a temperature and sensing means including a bimetal coil disposed in said opening in said vertical fin and having an outer end attached to said vertical fin,
   c. a flat horizontal fin carried by said device and joining with said vertical fin to a rear of said opening therein to form a rigid body,
   d. a depth control means including a shaft rotatably carried by and transversely positioned to a longitudinal axis of said device and having a middle portion operatively connected to an inner end of said coil, and a triangular-shaped control fin operatively connected to end portions of said shaft and positioned to have an obtuse angle apex positioned to a front of said shaft to align with a horizontal axis of said device when said coil senses a water temperature equal to said selected temperature, and
   e. a prow formed in part by said tapered front portion of said vertical fin and including a right and left vertical offset positioned to cover a portion of said apex of said control fin as said control fin rotates in response to changing water temperatures,
   whereby said bimetal coil senses an ambient temperature of said water and selectively regulates an attitude of said control fin.

7. A depth control device as defined in claim 6 and further including, attaching holes for connecting a leader thereto and being located along a top edge of said vertical fin in alignment with a vertical plane intersecting the center of gravity of said device, and said horizontal fin and said shaft positioned in alignment with the horizontal axis of said device and above the center of gravity of said device.

8. Means to position a fish capturing device with water having a selected temperature comprising, a three-way swivel joint having a first, second and third attaching loop, said first loop adapted to be attached to a fish capturing device by a first leader positioned between said device and said first loop, said second loop attached to a depth control device by a second leader positioned between said depth control device and said second loop, and said third loop adapted to be attached to an end of a fishing line, said depth control device further including, a yaw and roll stabilizing means to cause said depth control device to travel in a streamlined path through said water including a flat elongated vertical fin carried by said device and having a tapered front portion and attaching means for said second leader located above the center of gravity of said device and proximately aligned with a vertical plane intersecting said center of gravity, a pitch and roll stabilizing means to cause said depth control device to travel in a streamlined path through said water including a flat horizontal fin carried by said device and positioned to align with a horizontal axis of said device and joining with said vertical fin to form a rigid body, a circular passage on a radius carried by said vertical fin below the longitudinal axis of said device and to the front of said center of gravity with the axis of said radius disposed above said passage, and a weight means disposed in said passage to lower said center of gravity below the longitudinal axis of said device, a temperature and sensing means including a bimetal coil having an outer end attached to said device, and a depth control means including a transversely positioned shaft rotatively carried by said body to align with a horizontal axis of said device, said shaft having a middle portion operatively connected to an inner end of said bimetal coil, and a triangular-shaped control surface having fin portions carried by respective ends of said shaft and positioned to form a prow with said tapered front portion of said vertical fin, wherein said control device, by regulation of said depth control means by said temperature and sensing means, positions said fish capturing device by causing selective vertical movement of said three-way swivel.

9. Means to position a fish capturing device as defined in claim 8 and further characterized by, said prow including a right and left vertical flange carried by said vertical fin and positioned to protect fin portions.

10. A depth control device for use while fishing comprising, a rigid body, b. a temperature sensing and actuating means in said body including a bimetal coil having an outer end connected to said body and generating a proportional directional force upon sensing a positive differential between a sensed ambient water temperature and a selected water temperature and a proportional counter directional force upon sensing a negative differential between the sensed ambient water temperature and the selected temperature, c. a first attaching means for connecting a fishing line to said body, d. a vertical and horizontal stabilizing means attached to said body for minimizing yaw, pitch and roll deviations about a path of movement, e. a depth control means mounted on said body for movement relative thereto and more particularly comprising a rotary hydrodynamic horizontal control fin, f. means operatively connecting said sensing and actuating means including an inner end of said coil operatively connected to said fin and aligning said fin with the longitudinal axis of said body upon sensing an ambient water temperature equaling the selected water temperature and selectively rotating said fin by the forces generated to a diving or surfacing attitude, and further characterized by, said vertical stabilizing means comprising a fin having an upper and lower portion aligned with and disposed respectively above and below the longitudinal axis of said body, said fin having an elliptical opening to the front of said fin, said opening prepared for the disposition of the spiral coil and confining the outward expansion of said coil, said opening having a slot at the rear of said opening, said slot prepared for the disposition of the outer end of said coil, said coil disposed in said opening and said outer end disposed in said slot, said opening adjoining a second slot to the front of said opening, said second slot prepared for the movable disposition of a connecting member of said control fin, said outer edges of said fin being substantially horizontal but tapering to form a prow at the front of said device, said fin containing said first attaching means and more particularly comprising at least two fishing line attaching holes behind said prow, said holes being in the upper portion of said vertical fin, said fin prepared for joining with said horizontal stabilizing means, said operative connecting means comprising a shaft having a middle portion and outer end portion, said inner end of said coil connected to the middle portion of said shaft and said shaft rotatively driven thereby, said shaft having its outer portions prepared for connection to the control fin, said body having a right and left vertical shaft support, said supports located on each side of said vertical fin, said supports having a transverse hole prepared for the disposition of said shaft, said shaft being disposed with a loose fit in said holes, said supports having a slotted arched opening in the forward part of said supports respectively, said slots prepared for the movable disposition of the control fin connecting member and aligned with such similar slot in said vertical fin, said support having an outer elliptical shape tapering in front and rear, said surface having a horizontal slot at the rear prepared for the insertion and joining of said horizontal stabilizing means, said front portions joining with said vertical fin to form the prow of said body, said control fin comprising a right and left portion, each portion having a horizontal transverse hole through said portion, the outer portions of said shaft being disposed with a rigid fit in said holes respectively, said hole being located such that the effective horizontal surface area in front of said hole approximates the effective horizontal surface area to the rear of said hole, said fin portion being formed in the shape of a right triangle with the hypotenuse thereof forming the outer edge and one leg thereof parallel to the longitudinal axis of said body, the front section of said right and left control fin portions being joined by the connecting member, said member disposed in the respective slots in the vertical fin and right and left shaft support, and said horizontal stabilizing means comprising a horizontal fin being located adjacent to the rear edge of the control fin, said horizontal fin having gradually tapering outer edges such that its width narrows to approximate the width of the control fin at their adjacency, said fin joining with said vertical fin and shaft supports to form the body, wherein the control device dives to a water depth having the selected water temperature and is maintained in water having an ambient water temperature equaling the selected temperature when said device is attached to a fishing line connected to a fish capturing means and said device and capturing means are drawn through a body of water.

11. A depth control device assembly according to claim 10 and further characterized by said prow being pyramidally shaped and having a right and left vertical offset at the rear of said prow formed by the outer vertical surface of shaft supports and the base of said prow, said offset arched to provide for the rotation of the respective leading apex of the control fin portions within said offset.

* * * * *